United States Patent

Klippert et al.

[11] Patent Number: 6,131,482
[45] Date of Patent: *Oct. 17, 2000

[54] DEVICE FOR THE AUTOMATIC STEPPED CABLE LENGTH COMPENSATION OF A BOWDEN CABLE SYSTEM

[75] Inventors: Uwe Klippert, Oberaula; Christian Saunus, Grunbach; Georg Scheck, Weitramsdorf, all of Germany

[73] Assignee: Brose Fahrzeugteile GmbH & Co. KG, Coburg, Coburg, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/027,849

[22] Filed: Feb. 23, 1998

[30] Foreign Application Priority Data

Feb. 21, 1997 [DE] Germany ............... 197 06 866

[51] Int. Cl.[7] ............... F16C 1/10; G05G 1/04
[52] U.S. Cl. ............... 74/502.6; 74/502.4; 74/500.5; 74/526
[58] Field of Search ............... 74/500.5–502.6, 74/526; 49/352; 474/101

[56] References Cited

U.S. PATENT DOCUMENTS

| | | | |
|---|---|---|---|
| 3,439,555 | 4/1969 | Rech | 74/501 |
| 4,313,282 | 2/1982 | Hagemann et al. | 49/352 |
| 4,553,449 | 11/1985 | Korn | 74/501 R |
| 4,657,523 | 4/1987 | Chevance et al. | 474/101 |
| 4,799,400 | 1/1989 | Pickell | 74/502.6 |
| 4,869,123 | 9/1989 | Stocker | 74/501.5 R |
| 5,544,543 | 8/1996 | Hilgert et al. | 74/502.4 |
| 5,709,132 | 1/1998 | Irish et al. | 74/502.4 |
| 5,724,858 | 3/1998 | Polando | 74/502.6 |

FOREIGN PATENT DOCUMENTS

| | | |
|---|---|---|
| 0658696 | 12/1994 | European Pat. Off. |
| 3143765 | 5/1982 | Germany . |
| 88 07 826 U | 9/1988 | Germany . |
| 383280 | 4/1989 | Germany . |
| 3805046 | 6/1989 | Germany . |
| 4109887 | 10/1992 | Germany . |
| 19603893 | 11/1996 | Germany . |
| WO 93/22571 | 11/1993 | WIPO ............... 74/502.4 |
| WO 96/25604 | 8/1996 | WIPO . |

Primary Examiner—Vinh T. Luong
Attorney, Agent, or Firm—Christie, Parker & Hale, LLP

[57] ABSTRACT

A device for the automatic incremental cable length compensation of a Bowden cable system having a housing side and a Bowden tube side. The device includes a cable having a pulling axis, a part on the housing side including a number of detent elements axially arranged in a direction of the pulling axis, and a part on the Bowden tube side with two spaced apart stops axially aligned in the direction of the pulling axis and displaceable relative to the part on the housing side. The cable extends through both the part on the housing side and the part on the Bowden tube side. A spring is positioned between the part on the housing side and the part on the Bowden tube side for tensioning the cable. A locking element is displaceably mounted between the two axially aligned spaced stops in the part on the Bowden tube side so that a cable length compensating detent movement can only take place after overcoming a predetermined setting distance. The locking element includes at least one detent element directed radially outward from the pulling axis and being shaped to engage any of the detent elements on the part on the housing side.

23 Claims, 5 Drawing Sheets

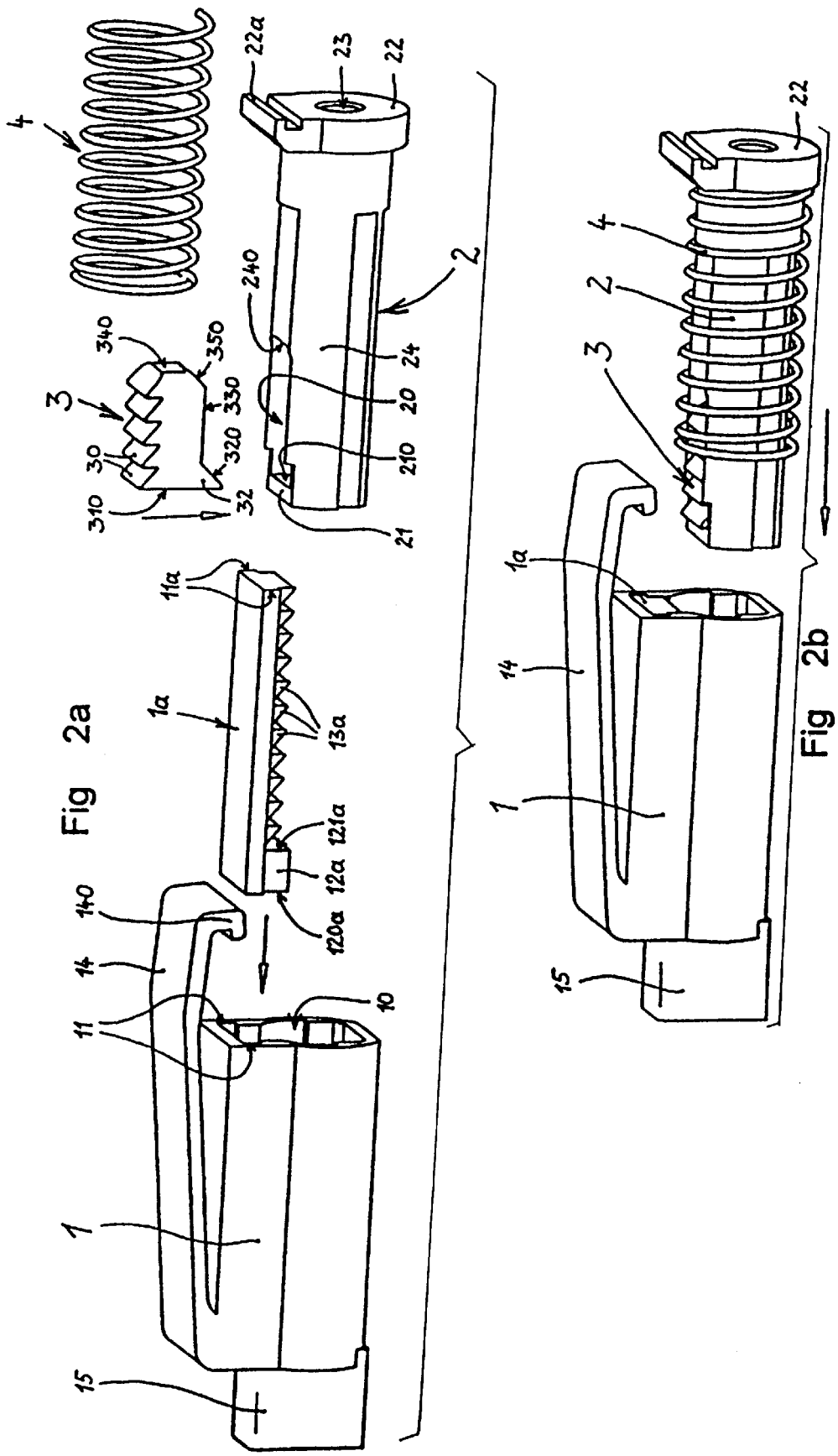

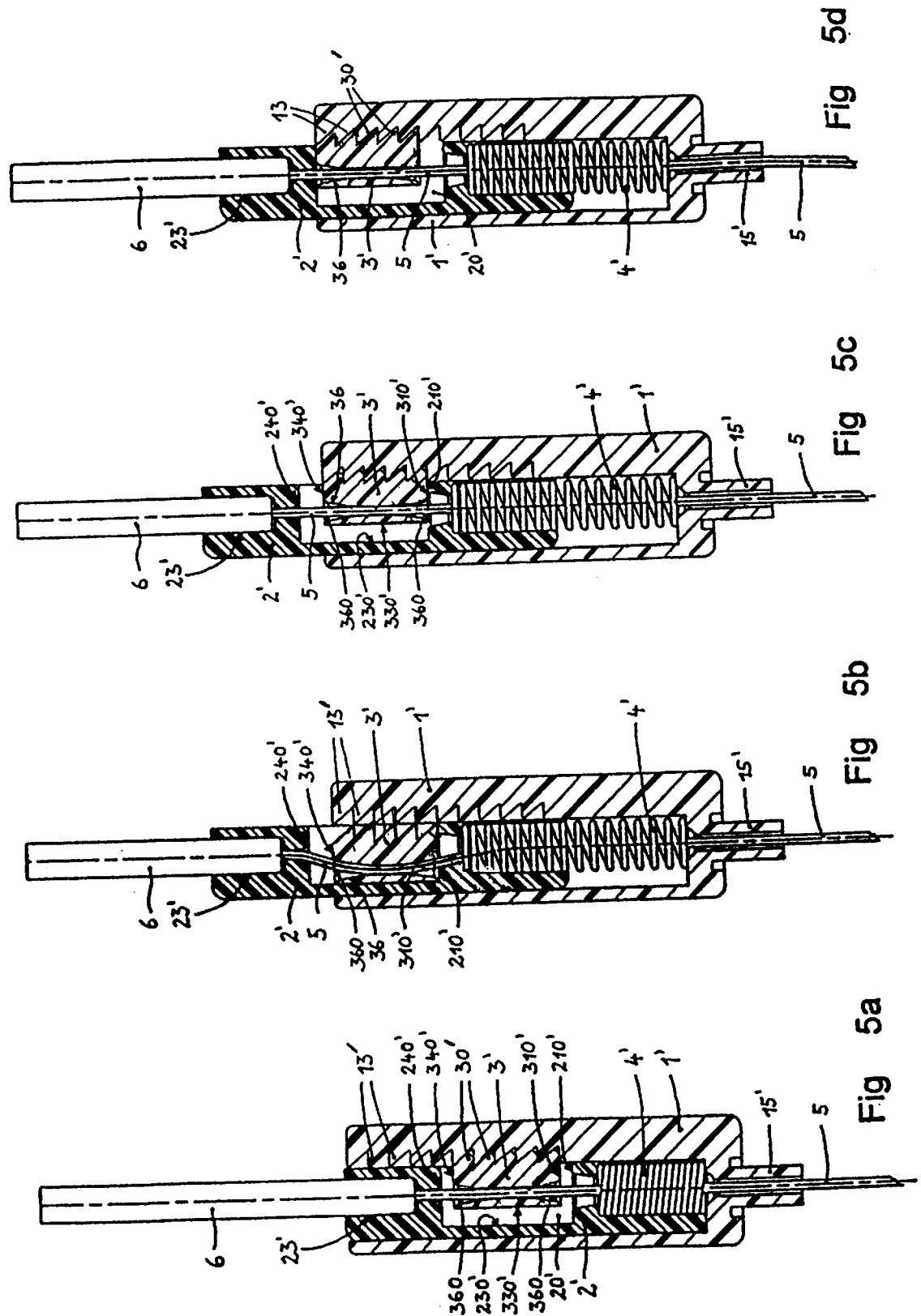

DEVICE FOR THE AUTOMATIC STEPPED CABLE LENGTH COMPENSATION OF A BOWDEN CABLE SYSTEM

BACKGROUND

The invention relates to a device for the automatic stepped, or incremental, cable length compensation of a Bowden cable system. Various embodiments of the invention are characterized by a simple construction, a reliable method of functioning, and the possibility of being made optionally from plastics or metal or a combination of the two materials.

Cable length compensation devices are generally used where cables are used as force-transferring members, and the cable lengthening, e.g., permanent stretching of the cable, which occurs under the action of the force needs to be compensated to maintain the functioning of the system. Such devices have had widespread use, particularly for so-called Bowden window regulators, for raising and lowering the side window panes of motor vehicles.

Common to many cable length compensation devices is the use of two parts movable relative to one another which are held under tension by a spring and carry out an adjusting movement when cable slack occurs. This adjusting movement corresponds in effect to a lengthening of the Bowden tube.

Furthermore it is known from DE 38 05 046 C2 to lock, by means of detent elements, the relative position of the two movable parts reached following the adjusting movement. A number of narrow successive detent elements which can drop one after the other behind the free end of the displaceable part guarantees a finely-stepped cable length compensation. This device is however not in a position to differentiate between a so-called genuine cable slack and an apparent cable slack which occurs in the event of high strain on a cable loop of a cable window regulator in the unstressed area of the cable loop. Thus considerable tensions can arise in the system which as a result of increased friction lead to a reduction in the degree of efficiency of the adjusting device and to accelerated wear and tear.

From EP 0 658 696 A1 a cable length compensation device is known for a Bowden window regulator which has a tubular part on the housing side and a part on the Bowden tube side which is movably mounted in the tubular part on the housing side. The part on the Bowden tube side supports both the Bowden tube on the one hand and a compression spring on the other hand, which presses the part on the Bowden tube side towards the Bowden tube. Several slits are formed evenly spread out over the circumference of the wall of the tubular part on the housing side so that detent teeth of an elastic split ring can pass through these slits to engage with counter teeth on the part on the Bowden tube side.

The expansion of the slits in the displacement direction is greater than the height of the detent teeth so that during displacement of the part on the Bowden tube side, first the detent teeth of the elastic split ring are entrained until they meet the boundary faces of the slits which act as stops. Only with a displacement movement beyond this is a relative movement caused between the elastic split ring and the part on the Bowden tube side, and thus a permanent, i.e., locked, setting movement, or rather, cable length compensation movement. The displacement movement is at least equal to the sum of the axial play of the elastic split ring in the slits of the part on the housing side and the division of the saw-tooth cogs of the part on the Bowden tube side. In each case the designated axial play for relaxing the tension of the system is provided by the supporting forces of the Bowden tube causing a restricted resetting movement of the displaceable part on the Bowden tube side until the detent teeth of the elastic split ring have reached the other stop of the slits.

The device described has however the drawback that the elastic split ring supported by the detent teeth can only be made of an elastic material owing to the high expanding capacity which is required for its assembly. Thus the forces which can be transferred by the elastic split ring are restricted.

A device which is very similar in construction and identical in its method of operation to that of EP 0 658 696 A1 is described in WO 96/25604. This device also consists of a part on the housing side and a sleeve-like part on the Bowden side which is displaceable therein and has external teeth in which the teeth of the locking element can engage. Also with this solution the locking element is mounted displaceably between two stops so that a movement play is formed with play allowance which provides the system with axial longitudinal play which prevents excessive tensioning of the adjustment device.

The drawback here however is that the inner arrangement of the detent element leads to the formation of comparatively small detent teeth. In conjunction with the locking element, which through necessity has to be made of plastics owing to the demands of elastic deformability, this device also can only be loaded to a restricted amount.

SUMMARY

According to an embodiment of the invention, a device is provided for the automatic stepped, or incremental, cable length adjustment, with play allowance, which has a simple construction, can be readily adapted to high stresses, and can be fitted simply and reliably.

According to one embodiment, a device is provided for the automatic incremental cable length compensation of a Bowden cable system having a housing side and a Bowden tube side. The device includes a cable having a pulling axis, a part on the housing side including a number of detent elements axially arranged in a direction of the pulling axis, and a part on the Bowden tube side with two spaced apart stops axially aligned in the direction of the pulling axis and displaceable relative to the part on the housing side. The cable extends through both the part on the housing side and the part on the Bowden tube side. A spring is positioned between the part on the housing side and the part on the Bowden tube side for tensioning the cable. A locking element is displaceably mounted between the two axially aligned spaced stops in the part on the Bowden tube side so that a cable length compensating detent movement can only take place after overcoming a predetermined setting distance. The locking element includes at least one detent element directed radially outward from the pulling axis and being shaped to engage any of the detent elements on the part on the housing side.

According to another embodiment, the axially aligned stops between which the locking element is mounted are a component part of the part on the Bowden tube side. The detent elements of the locking element are aligned radially outwards and can be brought into engagement with the corresponding detent elements which extend axially along the part on the side of the housing. In order to provide the play which is required in order to avoid undesirably high tension of the Bowden cable system there are at least three technical variations available which can also be combined with each other.

A) The distance between the stops of the part on the Bowden tube side is greater than the axial extension, or length, of the locking element. The difference determines the axial displaceability of the locking element and thus the amount of play which counteracts an undesired system tension.

B) The stops on the part on the Bowden tube side can however also be set so narrow that only a radial displacement of the locking element is guaranteed wherein the cable is forced away from the pulling axis by the locking element. During the process of engagement between the detent elements of the locking element and the part on the housing side, the outward curvature of the cable is reduced. The difference in the cable lengths between the maximum cable curvature and minimum cable curvature is the amount of play required to avoid excessive system tensions.

C) A further possibility for providing play is in the use of a rear cut section for the interengaging detent elements which should preferably be saw-tooth in design, with an inclined ramp flank and another radially aligned flank perpendicular to the direction of the axial setting movement. During interengagement of the teeth, an axial setting movement of the part on the Bowden tube side takes place in the direction of the supporting force of the Bowden tube. The axial setting movement of the part on the Bowden side must exceed the length of the inclined ramp on a saw-tooth detent element to cause a setting movement.

According to a preferred variation of the invention, a recess is provided in the part of the cable length compensating device on the Bowden tube side which can completely take up the locking element. The recess is defined in the axial direction by opposite stops with a spacing greater than the length of the locking element. The play required to prevent system tensioning is thereby defined, i.e., a cable length compensation can only take place after the structurally provided play in the compensating device is overcome. This play should preferably be no less than the division of the detent elements, where the division is the distance between the center points of two adjacent detent elements.

Opposite the detent elements of the locking element are the detent elements of the part on the housing side which extend along the displacement direction of the part on the Bowden side. Saw-tooth like detent elements have the advantage that their inclined flanks easily slide on one another during a cable-length compensating displacement movement and necessitate the release of the keyed engagement lock whilst the radially aligned flanks prevent a resetting movement of the part on the Bowden tube side beyond the reserved play. In the event of strain in the locking direction, saw-tooth like detent elements with rear cut section perpendicular to the displacement direction of the part on the Bowden side have a self-strengthening effect which secures the positive lock and thus the locking action. When using a markedly defined rear cut section, an additional play can also be reserved which counteracts undesired tensioning of the Bowden cable system. Finally the complete interengagement of the detent elements is accompanied by a resetting movement of the part on the Bowden tube side which corresponds to the extent of the rear cut section.

Since the locking element is guided inside a recess of the shaft of the part on the Bowden tube side, a passage must be provided for the cable. This can be produced for example by an open or closed cable channel in the locking element. It is however also possible to dimension the thickness of the locking element so that this can also be completely taken up by the recess of the part on the Bowden side even with the cable passing through.

According to another embodiment of the invention, the inner, substantially axially extending wall of the locking element is always in contact with the cable. When the cable is tensioned, a force acting in the locking direction is exerted by the cable on the locking element. Unlocking can thus only take place when the cable has slack and gives way to a radial movement of the locking element out of engagement with the detent elements of the part on the housing side. Also, structural security measures can also be provided which guarantee the locking state even with a very high strain on the cable. This can be reached by radially acting supporting faces between the locking element and the part on the Bowden tube side which engage with each other when the axially acting stops of these parts are pressed on each other as a result of strain on the Bowden side.

Another embodiment of the invention provides the use of a locking element on whose inside back wall a spring is supported which on the other hand is supported on the side wall (or opposing wall) of the recess of the part on the Bowden tube side and thus tensions the locking element elastically in the direction of the counter teeth of the part on the housing side. The spring and locking element preferably form a one-piece unit, more particularly in the form of an injection molded plastics part.

In order to ensure a particularly simple mounting of the cable length compensating device in the Bowden cable system and a simple and safe operation of the device, means are provided to lock the part on the Bowden side in a position set far into the part on the housing side wherein in this position, the spring has the greatest tension between the part on the housing side and the part on the Bowden tube side displaceable relative thereto. Suitable for this is, for example, a spring yoke connected to the part on the housing side and able to engage in the described position in a detent nose of the part on the Bowden side or the like. With the first significant strain on the Bowden cable system, for example, upon reaching a blocked state of the Bowden tube window regulator, the part on the Bowden tube side is pushed so far into the part on the housing side that the lock is automatically released by the spring yoke. A prerequisite here is obviously that the spring can still be sufficiently compressed and that the blocking force in the Bowden tube exceeds the spring force.

Since the detent elements on the part on the housing side are set on the inside a two-part design is to be selected in order to avoid complicated manufacturing tools. For example, a slider can be provided which supports the detent elements and is pushed into a snug-fitting guide of the part on the housing side.

BRIEF DESCRIPTION OF THE DRAWINGS

The invention will now be explained in further detail with reference to the embodiments and the illustrated drawings in which:

FIG. 2*a* is an exploded view of the individual parts of the cable length compensating device;

FIG. 2*b* is a perspective illustration of the individual parts of the cable length compensating device according to FIG. 1 with an external spring for maintaining the cable tension and before inserting the part on the Bowden tube side into the part on the housing side;

FIG. 4a is a cross section through the cable length compensating device according to FIG. 3c in the area of the locking element along line 4a—4a;

FIG. 5a is a sectional view through a cable length compensating device according to another embodiment of the invention with a cable channel through the locking element and with a spring on the inside to maintain the cable tension, wherein the spring is compressed the maximum amount;

FIG. 5b is like FIG. 5a but after the execution of a cable length compensating movement with a still unstressed cable before interengagement of the saw teeth of the locking element and the teeth of the part on the housing side;

FIG. 5c is like FIG. 5b but after tensioning of the cable wherein the saw teeth of the locking element and the teeth of the part on the housing side enter into engagement;

FIG. 5d is like FIG. 5c but after the resetting movement of the part on the side of the Bowden tube up to the stop against the locking element wherein the play is taken into account to reduce the system tension.

DETAILED DESCRIPTION

Figure 1:
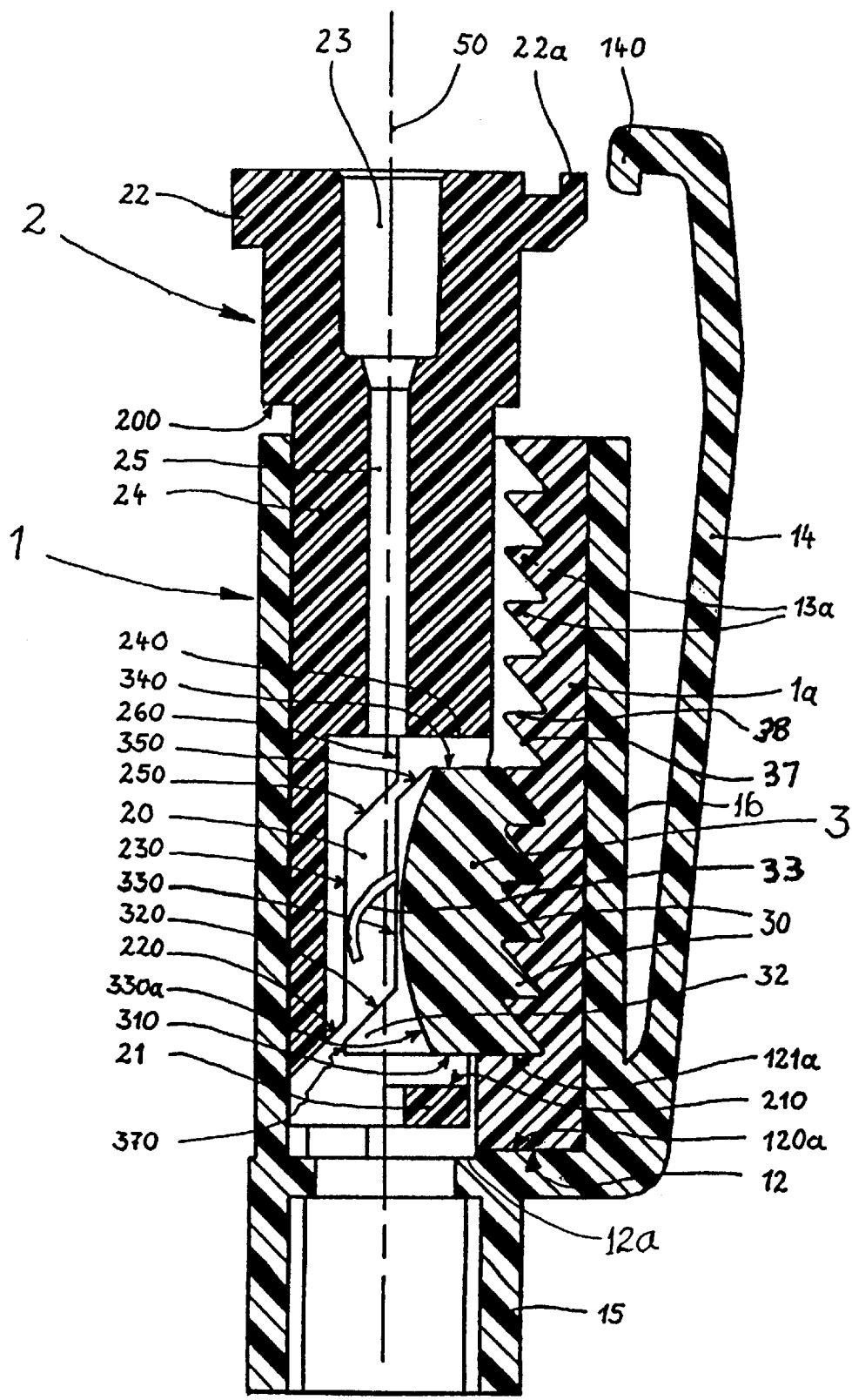
FIG. 1 is a sectional view along line 1—1 of FIG. 4*a* of a cable length compensating device according to an embodiment of the invention with elements for fixing the locking element in the event of strain on the Bowden tube side, with a spring yoke for locking the assembly position of the part on the Bowden tube side inside the part on the housing side.

The embodiments illustrated in the drawings and described in detail below ere developed specially for use in Bowden tube window regulators; they can however also be used in other Bowden tube systems. The different variations of the principle of the invention allow numerous adaptations to the special requirements for each individual case.

The device for the cable length compensation of a Bowden tube system according to the embodiment shown in FIGS. 1–4 consists overall of five individual parts, which— except for a spring 4—are all injection molded plastics parts. A housing side part 1 of the Bowden tube window regulator can also be integrated in a bearing cover of a cable drum housing of a Bowden tube window regulator wherein the bearing cover represents the so-called part on the base side. FIG. 2 shows these parts in perspective in an exploded view. According to this embodiment, the device consists of part 1 on the housing side of the Bowden tube window regulator with an integrally molded spring yoke 14, an insert part 1a, which supports the detent elements 13a on the part 1 on the housing side, a part 2 on a Bowden tube side part 2 with a Bowden tube socket 23, a locking element 3 which is inserted in a recess 20 of the part 2 on the Bowden tube side, and coil spring 4 which supplies the force required for the setting movement for the purpose of compensating the cable length.

FIG. 2 shows the device immediately before its assembly. As shown, the locking element 3 was already inserted in the recess 20 and the spring 4 pushed up to the stop against a head 22 whereby at the same time the locking element 3 is secured against falling out. In order to ensure a problem-free insertion of the part on the Bowden side into a hollow cavity 10 of the part 1 on the housing side, the detent elements 13a and 30 ought not to contact each other during insertion. Therefore, the locking element 3 must be completely housed by the recess 20. This is the case if stop face 210 of the part 2 on the Bowden tube side and stop face 310 of the locking element lie one on the other. The insert part 1a was pushed by its webs 11a into the grooves 11 of the part 1 on the housing side.

Figure 3A:
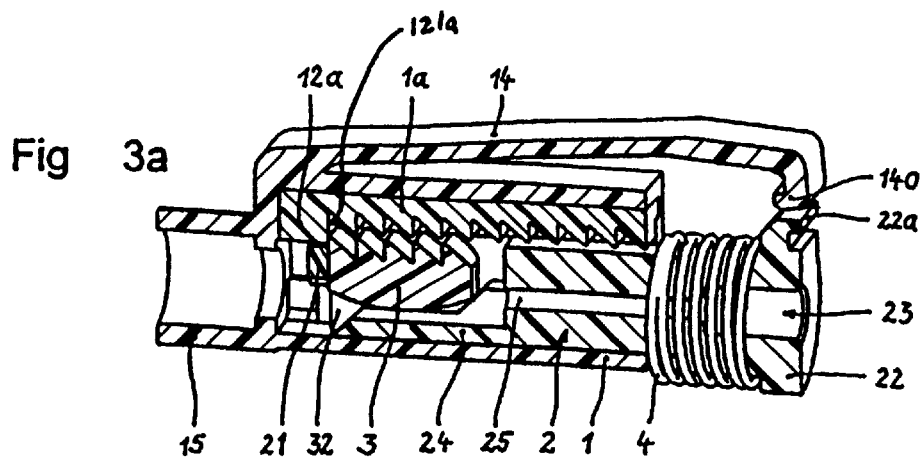
FIG. 3a is a perspective sectional view of a cable length compensating device according to FIG. 1, axially broken away, immediately before reaching the locking position of the part on the Bowden tube side.

FIG. 3a shows the device, axially broken away, after insertion of the part 2 on the Bowden tube side wherein the stop face 310 of the locking element 3 has just reached the stop face 121a of the block 12a. The block 12a is supported on the one hand with the stop face 120a on an end stop 12 of the part 1 on the housing side (see also FIGS. 1 and 2a). With further penetration of the shaft 24 into the hollow cavity 10 of the housing 1, the block 12a, which projects over the detent elements 13a, prevents the locking element 3 from further penetration. This results in the slide faces 320, 350 of the locking element 3 sliding on the slide faces 220, 250 of the Bowden tube side part 2 as a result of which the locking element 3 is radially displaced and engages with its detent elements 30 partially into the detent elements 13a. Thus the clearance required for passing through a cable 5 (see FIG. 3b), with pulling axis 50, is provided between a guide face (wall) 330a of the locking element 3 and the side wall 230 of the part 1 on the housing side.

Slide faces 320, 350 run at an angle to the pulling axis of the cable and are preferably molded in two end areas of the locking element 3. These slide faces 320, 350 enter into engagement with slide faces 220, 250 provided on the Bowden tube side part 2. The engagement occurs when the cable 5 is relaxed, and the locking element is located away from a second one 240 of two axially aligned spaced stops 210, 240, either near a first one 210 of two axially aligned spaced stops 210, 240 or in a central position between the two axially arranged spaced stops 210, 240. At least one of the slide faces 330, 370 on the locking element 3 is adjoined by a supporting face 230, 260 provided on the Bowden tube side part 2 (the supporting faces which can be brought into engagement with each other) when the locking element 3 is located near the second 240 of the two axially aligned spaced stops 210, 240.

The axially arranged detent elements 13a of the housing side part 1 are a component part of a separate insert member 1a which can be connected to an inner wall 1b of the housing side part 1. An innermost detent element 13b of the plurality of axially arranged detent elements 13a of the housing side part 1 forms the stop face 121a (or stop) which projects radially further inwards than all the remaining detent elements. With the Bowden tube side part 2 inserted completely into the housing side part 1, the innermost detent element 13b lies between the first and second stops 210, 240 near the first stop 210, and that on completely inserting the Bowden tube side part 2 into the housing side part 1, the third stop 121a strikes the stop face 310 (or stop) provided on the locking element 3 wherein the locking element 3 is brought into a central position between the first and second stops 210, 240 and is brought into a position raised from a side wall (or supporting surface) 230 so that the cable 5 can be pushed through the cable length compensating device.

Figure 3B:
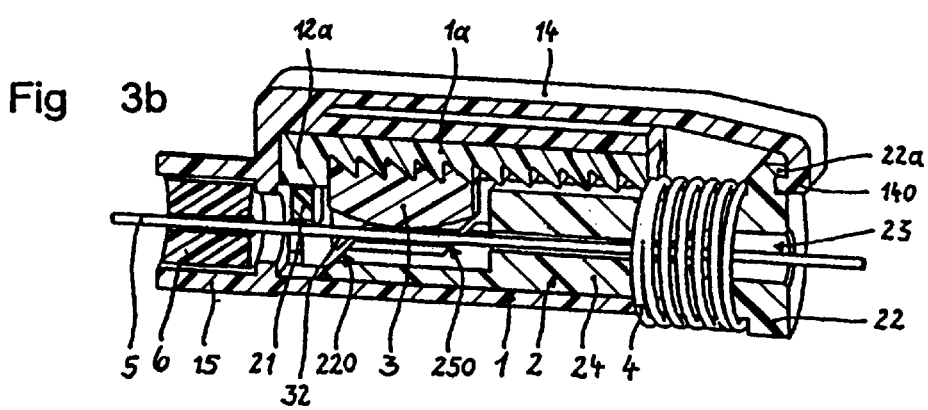
FIG. 3b is a perspective sectional view of a cable length compensating device according to FIG. 1, axially broken away, in the locking position of the part on the Bowden tube side.

FIG. 3b shows the device in the locked assembly state wherein the detent noses 22a, 140 of the part 2 on the Bowden tube side and the spring yoke 14, respectively, engage with each other in positive locking engagement. On passing through the cable 5, the locking element 3 is raised further due to tension in the cable so that the detent elements 13a, 30 of the part 1 and the locking element 3 are now fully in engagement. From FIG. 3c it is possible to see a perspective external view of the device in which adapter 15 is pushed onto a base-side part (not shown), e.g., a gearbox housing. FIG. 4b shows that the adapter 15 is not rotationally symmetrical. Turning of the device is thereby prevented.

Another embodiment of the invention provides the use of a locking element 3 on whose inside back wall 320 a spring 33 is supported which on the other hand is supported on the side wall 230 of the recess of the part on the Bowden tube side and thus tensions the locking element 3 elastically in the direction of the counter teeth 13a of the part 1 on the housing side. The spring 33 and locking element 3 preferably form a one-piece unit, more particularly in the form of an injection molded plastics part.

The method of operation of the cable length compensating device will not be explained in further detail with reference to FIGS. 1 and 3.

Figure 3C:
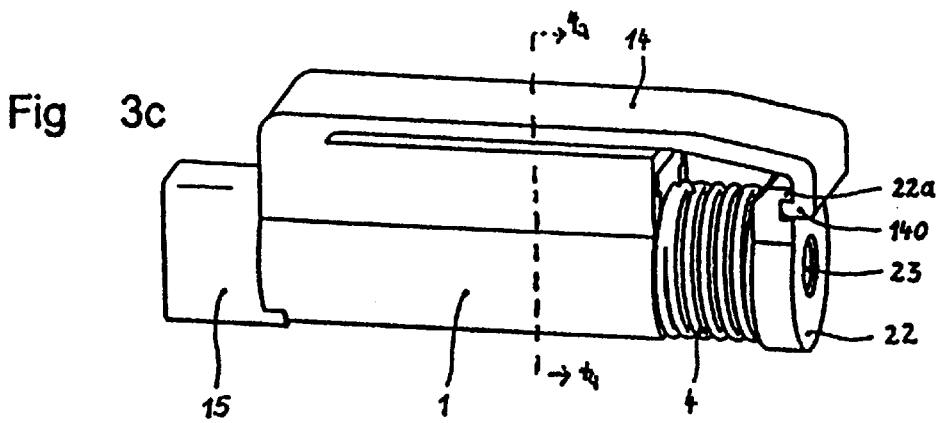
FIG. 3c is a perspective view of the cable length compensating device according to FIG. 1 in the locking position of the part on the Bowden tube side.
Figure 4A:
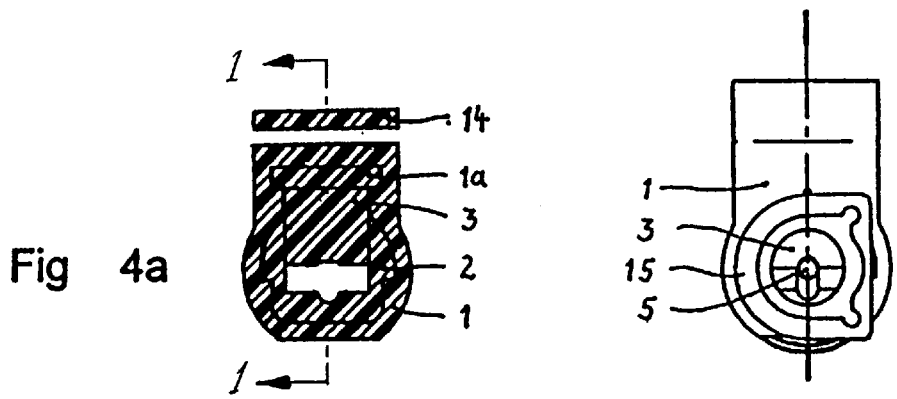
Figure 4B:
FIG. 4b is a view of the cable length compensating device from the side of the adapter.

Following the assembly of the individual parts into a pre-assembled unit, as shown in FIGS. 3b and 3c, the cable length compensating device can be integrated in a Bowden cable system. In order to ensure a particularly simple mounting of the cable length compensating device in the Bowden cable system and a simple and safe operation of the device, means are provided to lock the part 2 on the Bowden side in a position set far into the part 1 on the housing side wherein in this position, the spring 4 has the greatest tension between the part 1 on the housing side and the part 2 on the Bowden tube side displaceable relative thereto. Suitable for this is, for example, spring yoke 14 on the part 1 on the housing side is able to engage in the described position in detent nose 22a of the part 2 on the Bowden side. With the first significant strain on the Bowden cable system, for example, upon reaching the blocking state of the Bowden tube window regulator, the part 2 on the Bowden tube side is pushed so far into the part 1 on the housing side that the lock is automatically released by the spring yoke 14. A prerequisite here is obviously that the spring 4 can still be sufficiently compressed and that the blocking force exceeds the spring force. The adapter 15 is fitted together with the counter piece (not shown) of a part on the base side and the Bowden tube 6 is pushed into the Bowden tube socket 23. Manual unlocking of the part 2 on the Bowden tube side by the spring yoke 14 is not required if, on the part of the Bowden tube 6 (see FIG. 3b) during operation of the Bowden cable system, tension forces in the cable are anticipated which are greater than the spring force of the spring 4. In this case the part 2 on the Bowden tube side is pushed out of its position according to FIG. 3b so far into the part 1 on the housing side that the base stop 21 meets an edge stop 12a of the part 1 on the housing side. The detent noses 22a, 140 thereby come out of engagement and the spring yoke 14 springs outwards. Even if the cable length compensating movement does not directly follow the unlocking of the detent noses 22a, 140, renewed locking of the spring yoke 14 is precluded.

As soon as a cable slack occur, the spring 4 presses the part 2 out of the part 1 on the housing side until the cable slack is compensated. This setting movement corresponds in effect to a Bowden tube lengthening. The stop 210 of the base 21 of the part 2 on the Bowden tube side thereby passes into engagement with the stop face 310 of the locking element 3 and entrains the locking element 3 axially. At the same time, a radial movement of the locking element 3 is carried out which releases the engagement of the detent elements 13a and 30 and slides the cable 5 by means of the guide face 330a out of the pulling axis 50 (see FIG. 1). This deflection of the cable 5 takes up a part of the cable slack and cannot be compensated.

As soon as the area of the Bowden cable system in which the cable length compensating device is mounted is strained again, the cable 5 becomes taut and presses the teeth 13a, 30 into each other. At the same time this leads to an axial setting movement of the part 2 on the Bowden tube side until its stop 240 strikes the stop face 340 of the locking element 3. During this setting movement the angularly running slide faces 220, 250 of the housing and the slide faces 320, 350 of the locking element 3 slide on each other and press the detent elements 13a and 30 completely into each other provided this has not yet occurred through the tautness of the cable 5. At this point, axially aligned supporting (or slide) faces 230, 260 on the Bowden tube side part 2 and 330, 370 of the locking element 3, as shown in FIG. 1, which adjoin one another at the conclusion of the setting movement of the part 2 on the Bowden tube side and thus secure the locking position of the locking element 3.

Opposite the detent elements 30 of the locking element 3 are the detent elements 13a of the part 1 on the housing side which extend along the displacement direction (arrow) of the part 2 on the Bowden side as shown in FIG. 2b. Saw-tooth like detent elements have the advantage that their inclined flanks 37 easily slide on one another during a cable-length compensating displacement movement and necessitate the release of the keyed engagement lock whilst the radially aligned flanks with rear cut sections 38 (see FIG. 1) prevent a resetting movement of the part on the Bowden tube side beyond the reserved play. In the event of strain in the locking direction, saw-tooth like detent elements with rear cut section 38 perpendicular to the locking direction have a self-strengthening effect which secures the positive lock and thus the locking action. When using a markedly defined rear cut section 38, an additional play can also be reserved which counteracts undesired tensioning of the Bowden cable system. Finally the complete interengagement of the detent elements 13a, 30 is accompanied by a resetting movement of the part 2 on the Bowden tube side which corresponds to the extent of the rear cut section 38.

In order to provide the play which is required in order to avoid undesirably high tension of the Bowden cable system there are at least three technical variations available which can also be combined with each other.

A) The distance between the stops 210, 240 of the part 2 on the Bowden tube side is greater than the axial extension, or length, of the locking element 3. The difference determines the axial displaceability of the locking element and thus the amount of play which counteracts an undesired system tension.

B) The stops 210, 240 on the part 2 on the Bowden tube side can however also be set so narrow that only a radial displacement of the locking element is guaranteed wherein the cable 5 is forced away from the pulling axis 50 by the locking element 3. During the process of engagement between the detent elements 30 of the locking element 3 and the part 1 on the housing side, the outward curvature of the cable 5 is reduced. The difference in the cable lengths between the maximum cable curvature and minimum cable curvature is the amount of play required to avoid undesired system tensions.

C) A further possibility for providing play is in the use of a rear cut section 38 for the interengaging detent elements which should preferably be saw-tooth in design with an inclined ramp flank 37 and a flank 38 perpendicular to the direction of the axial setting movement. During interengagement of the teeth 13a, 30, an axial setting movement of the part 2 on the Bowden tube side takes place in the direction of the supporting force of the Bowden tube. The axial setting movement of the part on the Bowden side must exceed the length of a saw-tooth detent element 13a, 30 to cause a setting movement.

The reserved play in one embodiment of the invention is thus produced from the path of the axial displaceability of the locking element 3 between the stops 210, 240 and from the cable slack shifted in the device, caused by the radial displacement of the locking element 3 into and out of engagement with the detent elements 13a of the part 1 on the housing side. This naturally also means that setting movements which are smaller than the possible axial displacement path of the locking element 3 in the recess 20, do not lead to any new detent position of the locking element 3 and thus do not lead to a cable length compensation. Permanent excessive mechanical tensions in the Bowden cable system are thereby reliably prevented.

The embodiment of FIG. 5a uses a part 1' on the housing side with one-piece integrated detent elements 13', an internal spring 4' and a locking element 3' with a cable channel 36 with conically widening channel ends 360. This is to facilitate the passage of the cable 5 through the locking element 3'. Similarly as with the variation of the invention just described, the locking element 3' is mounted in a recess 20' in which it is axially displaceable between the stops 210', 240'. The method of operation of this device corresponds essentially to that of FIG. 1.

FIG. 5a shows the assembly position of the device with the maximum compressed spring 4' and engaged locking element 3'. A cable slack resulted according to FIG. 5b in a cable length compensating movement in that the spring 4' pressed out the part 2' on the Bowden tube side partially from the part 1' on the housing side whereby also the detent elements 13', 30' have passed out of engagement as a result of a radially aligned sideways movement. The engagement of the teeth 13', 30' is again restored by tightening of the cable 5 (see FIG. 5c). With renewed strain on the Bowden tube 6 on the supporting force arising therefrom causes a resetting movement of the part 2' on the side of the Bowden tube, until the stop 240' strikes the stop face 340' of the locking element 3' (see FIG. 5d). The resetting movement comprises the play structurally reserved for the relaxing of the Bowden tube system.

Since the locking element 3' is guided inside a recess of the shaft of the part on the Bowden tube side, a passage must be provided for the cable. This can be produced for example by an open or closed cable channel in the locking element. It is however also possible to dimension the thickness of the locking element 3' so that this can also be completely taken up by the recess of the part on the Bowden side even with the cable passing through.

Figure 6:
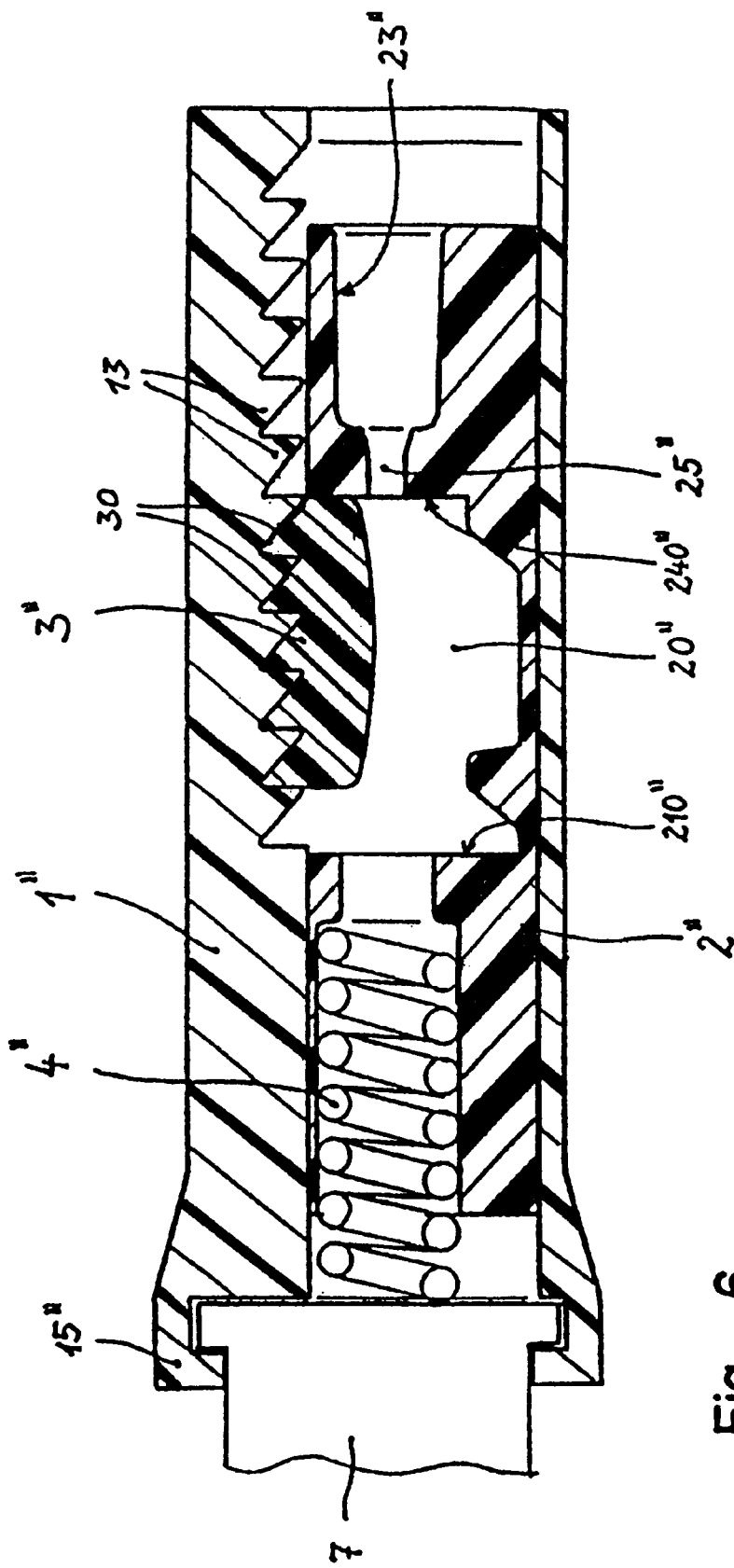
FIG. 6 is a sectional view of a cable length compensating device according to another embodiment of the invention where the fitting of the part on the Bowden tube side into the part on the housing side is carried out from the side of the adapter.

The basic construction and method of operation of the embodiment of FIG. 6 correspond substantially to the descriptions above. The most significant difference is that the part 2" on the Bowden tube side can be pushed into the housing 1" from the side of the adapter 15". A simple nested fitting is thus possible which is carried out in the following sequence: First the part 1" on the housing side is threaded onto the cable end, then the part 2" on the Bowden tube side and finally the spring 4". After the locking element 3" has been inserted in the recess 20" the housing can be drawn over all the parts 2", 3", 4" and fixed by the adapter 15" on the base. This assembly direction has the advantage that the detent elements 13, 30 can also then not hook in each other if the locking element projects slightly out of the recess.

What is claimed is:

1. A device for the automatic stepped cable length compensation of a Bowden cable system having a cable with a pulling axis, the device comprising:

a housing side part;

a Bowden tube side part having a cable channel for receiving the cable, the Bowden tube side part mounted to move relative to the housing side part and having a first stop and a second stop that is axially aligned with and spaced from the first stop;

a spring supported between the housing side part and the Bowden tube side part; and a locking element having a detent element, the locking element mounted to move between the first and second axially aligned spaced stops in the Bowden tube side pat so that when mounted to a Bowden cable system a cable length compensating detent movement takes place only after overcoming a predetermined setting distance, the locking element mounted to move radially to the pulling axis between first and second radial positions;

wherein the housing side part has a plurality of detent elements axially arranged with respect to the pulling axis, wherein the first radial position of the locking element is further away radially from the plurality of detent elements of the housing side part than the second radial position;

wherein the plurality of detent elements are adapted to engage the detent element on the locking element when the locking element moves radially from the first radial position to the second radial position;

wherein the detent element of the locking element is directed radially outwards relative to the pulling axis.

2. The device according to claim 1, wherein in order to provide play required to avoid excessive tensioning of the cable in the Bowden cable system, the locking element is axially displaceable between the first and second axially aligned spaced stops in the Bowden tube side part.

3. The device according to claim 1, wherein a recess is provided in the Bowden tube side part and extends between the first and second axially aligned spaced stops to hold the locking element, and the recess has a depth for housing the locking element completely.

4. The device according to claim 1, wherein in the event of strain on the Bowden tube side part, from tension in the cable, the locking element is secured against radial displacement to secure the engagement of the plurality of detent elements of the housing side part with the detent element of the locking element.

5. The device according to claim 4, wherein the locking element has at least one area which, with strain on the Bowden tube side part by tension in the cable, is brought into keyed connection with the Bowden tube side part so that the locking element is secured against radial displacement.

6. The device according to claim 4, wherein the Bowden tube side part further comprises at least one supporting face and two slide faces, wherein the locking element further comprises two end areas, at least one slide face substantially parallel to the pulling axis, and two slide faces running at an angle to the pulling axis of the cable, the two slide faces of the locking element are molded in the two end areas of the locking element and enter into engagement with the two slide faces respectively provided on the Bowden tube side part when the cable is relaxed and the locking element is located away from the second stop, and that the at least one slide face on the locking element is adjoined by the at least one supporting face provided on the Bowden tube side part when the locking element is located near the second stop.

7. The device according to claim 6, wherein an innermost detent element of the plurality of axially arranged detent elements of the housing side part forms a third stop which projects radially further inwards than all the remaining detent elements of the plurality of axially arranged detent elements, and with the Bowden tube side part inserted completely into the housing side part, the third stop lies between the first and second stops near the first stop, and that on completely inserting the Bowden tube side part into the housing side part, the third stop strikes a fourth stop provided on the locking element wherein the locking element is spaced from the first stop and is brought into a position spaced from a side wall of the Bowden tube side part to permit the cable to be pushed through the cable length compensating device.

8. The device according to claim 1, wherein the axially arranged detent elements connected to the housing side part and the detent element of the locking element has a sawtooth shape.

9. The device according to claim 1, wherein the first and second stops are spaced so that the locking element is displaceable between said stops by a path which corresponds at least to a division of the teeth.

10. The device according to claim 1, wherein the plurality of axially arranged detent elements of the housing side part are a component part of a separate insert member which connects to an inner wall of the housing side part.

11. The device according to claim 10, wherein the insert member is formed as a slider and inserts axially into the housing side part to an end stop provided on the housing side part, and wherein axially aligned grooves and webs are provided for fixing the insert member in the housing side part.

12. The device according to claim 1, wherein the cable is in engagement with the locking element so that when the cable is taut, the locking element is pushed at least so far in the direction of the corresponding plurality of detent elements on the housing side part that said detent elements engage at least in part in the detent element on the locking element.

13. The device according to claim 12, wherein when the cable is drawn taut and the plurality of detent elements on the housing side part completely engage the detent element on the locking element, a guide face provided on the locking element, that faces away from the at least one detent element, is not in contact with the taut cable.

14. The device according to claim 13, wherein the guide face facing away from the at least one detent element of the locking element projects over the pulling axis of the cable so that when the cable is drawn taut and the plurality of detent elements on the part on the housing side engage completely, the at least one detent element on the locking element, a radial force is exerted by the cable on the locking element in a locking direction of the device.

15. The device according to claim 1, wherein the locking element has a cable channel extending therethrough which widens conically at its ends.

16. The device according to claim 1, wherein the locking element is in connection with the spring which acts in a locking direction of the device.

17. The device according to claim 16, wherein the spring is an integral component part of the locking element.

18. The device according to claim 1, wherein the housing side part and the Bowden tube side part lock together in an assembly position.

19. The device according to claim 18, wherein the housing side part is in connection with a spring yoke having a free end that supports a detent nose which is brought into engagement with a detent nose provided on the Bowden tube side part when the Bowden tube side part is inserted the furthest into the housing side part in the assembly position, and wherein the spring yoke springs automatically out of the locking position when a base stop on the Bowden tube side part first meets an edge stop on the housing side part during the operation of the device.

20. The device according to claim 19, wherein the spring has in a maximum compressible state a lower spring force than a maximum supporting force of the Bowden tube which is anticipated during the operation of the device.

21. The device according to claim 1, wherein in order to provide play required to avoid excessive tensioning of the Bowden cable system, the locking element is radially displaceable between the plurality of detent elements of the housing side part and an opposing wall of the Bowden tube side part when the cable is relaxed.

22. The device according to claim 1, wherein in order to provide play required to avoid excessive tensioning of the Bowden cable system, each of the plurality of detent elements on the housing side part and the detent element on the locking element have a rear cut section.

23. A device for the automatic incremental cable length compensation of a Bowden cable system having a cable with a pulling axis, the device comprising:

a housing side part including a plurality of detent elements axially arranged in a direction of the pulling axis;

a Bowden tube side part having a first stop and a second stop that is axially aligned in the direction of the pulling axis with and spaced from the first stop, and the Bowden tube side part mounted to move relative to the housing side part, wherein the cable extends through both the housing side part and the Bowden tube side part;

a spring positioned between the housing side part and the Bowden tube side part for tensioning the cable; and a locking element mounted for movement between the first and second axially aligned stops in the Bowden tube side part so that a cable length compensating detent movement takes place only after overcoming a predetermined setting distance, the locking element comprising a detent element directed radially outward from the pulling axis and being shaped to engage any of the plurality of detent elements on the housing side part.

* * * * *

UNITED STATES PATENT AND TRADEMARK OFFICE
CERTIFICATE OF CORRECTION

PATENT NO.    : 6,131,482
DATED         : October 17, 2000
INVENTOR(S)   : Uwe Klippert, Christian Saunus and Georg Scheck It is certified that error appears in the above-identified patent and that said Letters Patent is hereby corrected as shown below:

Title page,
Item [56], References Cited, FOREIGN PATENT DOCUMENTS, replace
"383280     4/1989    Germany ." with -- 3833280    4/1989   Germany . --.

Column 10,
Line 21, replace "pat" with -- part --.

Signed and Sealed this

Twelfth Day of November, 2002

Attest:

JAMES E. ROGAN
Attesting Officer          Director of the United States Patent and Trademark Office